United States Patent
Quan et al.

(10) Patent No.: US 11,286,411 B2
(45) Date of Patent: Mar. 29, 2022

(54) SYNERGIST FOR WATER-BASED DRILLING FLUID AND PREPARATION METHOD THEREFOR, WATER-BASED DRILLING FLUID AND APPLICATION THEREOF

(71) Applicant: Beijing Shida Bocheng Technology Co., Ltd, Beijing (CN)

(72) Inventors: Xiaohu Quan, Beijing (CN); Haiping Feng, Beijing (CN); Yihu Wang, Beijing (CN); Jianmin Chen, Beijing (CN); Yu Cao, Beijing (CN); Weizhi You, Beijing (CN); Junling Zhao, Beijing (CN); Jing Yang, Beijing (CN); Ang Li, Beijing (CN); Wei Quan, Beijing (CN)

(73) Assignee: Beijing Shida Bocheng Technology Co., Ltd, Beijing (CN)

( * ) Notice: Subject to any disclaimer, the term of this patent is extended or adjusted under 35 U.S.C. 154(b) by 0 days.

(21) Appl. No.: 17/036,007

(22) Filed: Sep. 29, 2020

(65) Prior Publication Data
US 2021/0009887 A1 Jan. 14, 2021

(30) Foreign Application Priority Data
Jul. 15, 2020 (CN) .......................... 202010681912.2

(51) Int. Cl.
*C09K 8/04* (2006.01)

(52) U.S. Cl.
CPC ............ *C09K 8/04* (2013.01); *C09K 2208/10* (2013.01); *C09K 2208/12* (2013.01); *C09K 2208/34* (2013.01)

(58) Field of Classification Search
CPC .. C09K 8/04; C09K 2208/10; C09K 2208/12; C09K 2208/34; C09K 8/5045; C09K 8/508; C09K 8/516; C09K 8/03; C09K 8/032; C09K 8/035; C09K 8/22; C09K 8/24; C09K 8/426; C09K 8/506; E21B 21/00
See application file for complete search history.

(56) References Cited

U.S. PATENT DOCUMENTS

2012/0213726 A1* 8/2012 Green ...................... C07C 6/04
424/70.24

FOREIGN PATENT DOCUMENTS

| CN | 108165241 B |   | 6/2018 |
|----|-------------|---|--------|
| CN | 108949122 A | * | 12/2018 |
| CN | 109321216 A | * | 2/2019 |
| CN | 109370549 A | * | 2/2019 |

* cited by examiner

*Primary Examiner* — Kumar R Bhushan

(57) ABSTRACT

A synergist for a water-base drilling fluid and a preparation method therefor, a water-base drilling fluid and an application thereof, and belongs to the field of drilling fluid technologies. The synergist is prepared from raw materials comprising the following parts by weight: 15~25 parts of sodium styrene sulfonate, 8~15 parts of allyl trimethyl ammonium chloride, 2~8 parts of didodecyldimethylammonium bromide, 1~5 parts of n-octyl triethoxysilane, 1~5 parts of propyltriethoxysilane, 1~5 parts of disodium lauryl sulfosuccinate, 10~20 parts of nano silica, 8~15 parts of paraffin, and the like.

10 Claims, 2 Drawing Sheets

(a) (b)

SYNERGIST FOR WATER-BASED DRILLING FLUID AND PREPARATION METHOD THEREFOR, WATER-BASED DRILLING FLUID AND APPLICATION THEREOF

CROSS REFERENCE TO RELATED APPLICATION

This application claims priority of Chinese Application No. 202010681912.5 filed on Jul. 15, 2020 and entitled "synergist for water-based drilling fluid and preparation method therefor, water-based drilling fluid and application thereof".

TECHNICAL FIELD

The present disclosure belongs to the field of drilling fluid technologies, and in particular relates to a synergist for a water-base drilling fluid and a preparation method therefor, a water-base drilling fluid and an application thereof.

BACKGROUND

With the increasing development of drilling technology, high-difficulty wells such as ultra-deep wells and extended reach wells have become the main research directions for oil and gas drilling. However, when drilling into a shale formation during drilling, the shale is easy to hydrate, swell and disperse when encountering traditional drilling fluids, making it difficult to drill into effective oil and gas formations, resulting in instability of the well wall and reservoir damage, etc.

After the year 2000, professor Jiang Guancheng et al. put forward "a basic theoretical system of gas wettability in porous media oil-gas reservoirs" for the first time and established a theory of amphiphobicity on the rock surface of the oil-gas reservoir, which can effectively solve the problem of well wall instability. CN108165241B discloses a super-hydrophobic composite material. After first mixing of nano-$TiO_2$ and nano-$SiO_2$, a dispersion of nano-$TiO_2$ and nano-$SiO_2$ is mixed with a fluorine-containing silicon coupling agent. The amphiphobic composite material can be used in water-base drilling fluids and can strongly inhibit hydration expansion and dispersion, thereby effectively solving the problems of well wall instability, reservoir damage and the like.

SUMMARY

The present disclosure provides a synergist for a water-base drilling fluid and a preparation method therefor, a water-base drilling fluid and an application thereof. The synergist has hydrophobic and oleophobic properties, can strongly inhibit hydration expansion and dispersion, and has a good lubricating effect, good reservoir protection effect, low toxicity and good compatibility.

In one aspect, the present disclosure provides a synergist for a water-base drilling fluid, which is prepared from raw materials comprising the following parts by weight:

15~25 parts of sodium styrene sulfonate, 8~15 parts of allyl trimethyl ammonium chloride, 2~8 parts of didodecyldimethylammonium bromide, 1~5 parts of n-octyl triethoxysilane, 1~5 parts of propyl triethoxysilane, 1~5 parts of disodium lauryl sulfosuccinate, 10~20 parts of nano silica, 8~15 parts of paraffin, 2~8 parts of ethanol, and 25~35 parts of water.

Further, the particle size of nano silica is 100~500 nm.

In another aspect, the present disclosure provides a preparation method for any of the above synergists, comprising the following steps:

1) after mixing didodecyldimethylammonium bromide with distilled water and ethanol, heating the mixture to 65~75° C., then adding nano silica, n-octyltriethoxysilane and paraffin to react to obtain a surface modified product;

2) cooling the above surface modified product, adding sodium styrene sulfonate, allyl trimethyl ammonium chloride, disodium lauryl sulfosuccinate and propyl triethoxy silane, and heating the mixture to 50~75° C. to react to obtain a synergist.

Further, in step 1), the reaction temperature is 65~75° C.; and the reaction time is 2~3 h.

Further, in step 2), cooling the surface modified product obtained in step 1) to 20~40° C.; the reaction temperature is 50~75° C.; and the reaction time is 8~16 h.

In another aspect, the present disclosure provides a water-base drilling fluid, which comprises any of the above synergists.

Further, the drilling fluid is prepared from raw materials comprising the following parts by weight:

90~110 parts of soil slurry, 2~4 parts of synergist, 1~2 parts of biomimetic inhibitor, 2~3 parts of biomimetic plugging agent, 2~3 parts of biomimetic wellbore strengthener, 1~3 parts of filtrate reducer with high temperature resistance, 1~3 parts of bonding lubricant, 0.2~0.5 parts of coating agent, 4~30 parts of salt, and weighting agent.

Further, the biomimetic inhibitor is aromatic amine hydrochloride;

the biomimetic plugging agent is polyimide modified nano graphene oxide;

the main chain of the biomimetic wellbore strengthener is methacrylate copolymer, and the side chain of it is grafted with dopamine hydrochloride.

Further, the bonding lubricant is a fatty acid glyceride lubricant;

the coating agent is obtained by copolymerization of acrylamide;

and the weighting agent is selected from at least one of barite and limestone.

In another aspect, the present disclosure provides an application of any of the above drilling fluid in the exploitation of shale gas.

THE PRESENT DISCLOSURE HAS THE FOLLOWING ADVANTAGES

The present disclosure provides a synergist for a water-base drilling fluid and an amphiphobic high-performance water-base drilling fluid. The synergist is scientifically compounded by didodecyldimethylammonium bromide, allyl trimethyl ammonium chloride, disodium lauryl alcohol sulfosuccinate and hydrophobic monomer n-octyl triethoxy silane and propyl triethoxysilane to form an ester emulsion, which can reduce the surface free energy of the rock, change the contact angle between water or oil phase and rock reservoir surface, and prevent water or oil phase from entering the reservoir. At the same time, it reduces the capillary pressure so that it can be used as an inhibitor, a lubricant and an oil-gas reservoir protective agent in water-base drilling fluid. In addition, the synergist has a micro-nano structure, which can realize full-scale plugging of micro-cracks of different sizes.

BRIEF DESCRIPTION OF DRAWINGS

The drawings constituting a part of the present disclosure are used to provide a further understanding of the present disclosure. The exemplary embodiments of the present disclosure and their descriptions are used to explain the present disclosure, and do not constitute an improper limitation of the present disclosure. In the drawings:

FIG. 6 shows a hydrophobic effect of the drilling fluid obtained in Example 4 and Comparative Example 1; wherein FIG. 6(a) shows the hydrophobic effect of the drilling fluid obtained in Example 4, and FIG. 6(b) shows a hydrophobic effect of the environmental protection system drilling fluid in Comparative Example 1.

DETAILED DESCRIPTION

Figure 1:
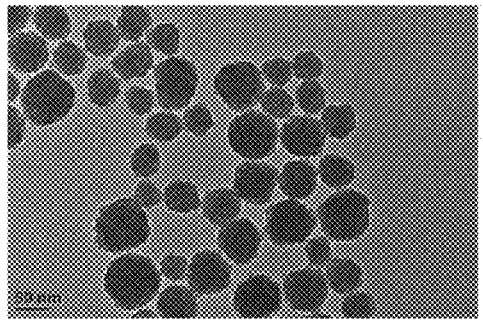
FIG. 1 shows a transmission electron micrograph of the synergist obtained in Example 1.

The technical solutions in the embodiments of the present disclosure will be described clearly and completely in conjunction with the embodiments and drawings in the present disclosure. Obviously, the embodiments described are only a part of the embodiments of the present disclosure, but not all the embodiments. In the case of no conflict, the embodiments in the present disclosure and the features in the embodiments can be combined with each other. The source of the reaction raw material is not specifically limited.

An embodiment of the present disclosure provides a synergist for water-base drilling fluid, and the synergist is prepared from raw materials comprising the following parts by weight:

15~25 parts of sodium styrene sulfonate, 8~15 parts of allyl trimethyl ammonium chloride, 2~8 parts of didodecyldimethylammonium bromide, 1~5 parts of n-octyl triethoxysilane, 1~5 parts of propyl triethoxysilane, 1~5 parts of disodium lauryl sulfosuccinate, 10~20 parts of nano silica, 8~15 parts of paraffin, 2~8 parts of ethanol, and 25~35 parts of water.

The synergist provided in the embodiment of the present disclosure is an additive composition for a water-base drilling fluid, which can improve the performance of water-base drilling fluid, and at the same time, serve as a hydrophobic agent, an inhibitor, a lubricant, an oil-gas reservoir protective agent and a plugging agent.

The synergist provided in the embodiment of the present disclosure combines didodecyldimethylammonium bromide, allyl trimethyl ammonium chloride, disodium lauryl alcohol sulfosuccinate, etc. with hydrophobic monomers n-octyl triethoxy silane and propyl triethoxysilane to react and obtain an ester emulsion synergist with hydrophobic and oleophobic effect. The particle size of the obtained ester emulsion is between 50~100 nm. After use, a nano-scale uneven rough structure is formed on the surface and the interconnected branches between the synergist products form a micron-scale physical structure as a whole.

The synergist provided in the embodiment of the present disclosure can reduce the surface free energy of the rock, change the contact angle between the water or oil phase and the rock reservoir surface, prevent water or oil phase from entering the reservoir and reduce the capillary pressure, making it used as an inhibitor, a lubricant and an oil-gas reservoir protective agent in water-base drilling fluid, so as to inhibit hydration expansion and dispersion, achieve the lubrication effect and self cleaning effect of reducing adhesion and resistance, and excellent oil-gas reservoir protection effect, thereby effectively protecting the reservoir. In addition, the micro-nano structure can achieve full-scale plugging of micro-cracks of different sizes, and achieve synergy by changing the surface tension of each contact surface. The synergist has the advantages of low toxicity, good compatibility, temperature resistance up to 150° C., and the application range is wider.

In further embodiments, the particle size of the nano silica is 100~500 nm. After the nano-scale silica is modified, it is polymerized with monomers such as sodium styrene sulfonate to make the ester emulsion synergist contain nano-scale particles. At the same time, the interconnected branches between the synergist products form a micron-scale physical structure as a whole, which is conducive to hydrophobic and oleophobic properties.

Another embodiment of the present disclosure also provides a preparation method for the synergist, comprising the following steps:

1) after mixing didodecyldimethylammonium bromide with distilled water and ethanol, heating the mixture to 65~75° C., then adding nano silica, n-octyltriethoxysilane, and paraffin to react to obtain a surface modified product;

2) cooling the obtained surface modified product, adding sodium styrene sulfonate, allyl trimethyl ammonium chloride, disodium lauryl sulfosuccinate and propyl triethoxy silane, then heating the mixture to 50~75° C. to react to obtain a synergist.

For the synergist provided in the embodiment of the present invention, firstly, the surface modification of nano-scale silica is carried out with didodecyl dimethyl ammonium bromide, paraffin wax and n-octyl triethoxy silane, then, the surface modification product is polymerized with sodium styrene sulfonate, allyl trimethyl ammonium chloride, disodium lauryl alcohol sulfosuccinate and propyl triethoxysilane to obtain an ester emulsion synergist with hydrophobic and oleophobic effect. Hydrophobic monomers are added in both the surface modification and polymerization stages, which is conducive to the hydrophobic and oleophobic properties of the product.

In further embodiments, in step 1), the reaction temperature is 65~75° C.; and the reaction time is 2~3 h. Specifically, after mixing didodecyldimethylammonium bromide with distilled water and ethanol, heating the mixture to 65~75° C., adding nano silica, n-octyltriethoxysilane and paraffin to perform a reaction under 65~75° C. for 2~3 h to obtain a surface modified product. In further embodiments, Further, in step 2), cooling the reaction product to 20~40° C.; the reaction temperature is 50~75° C.; and the reaction time is 8~16 h. In step 2), cooling the obtained surface modified product to 20~40° C., then adding sodium styrene sulfonate, allyl trimethyl ammonium chloride, disodium lauryl sulfosuccinate and propyl triethoxy silane, and heating the mixture to 50~75° C. to perform a reaction under 50~75° C. for 8~16 h to obtain the synergist.

Another embodiment of the present disclosure also provides a water-base drilling fluid, which comprises anyone of the above synergists.

Specifically, the water-base drilling fluid provided in an embodiment of the present disclosure is prepared from raw materials comprising the following parts by weight:

90~110 parts of soil slurry, 2~4 parts of synergist, 1~2 parts of biomimetic inhibitor, 2~3 parts of biomimetic plugging agent, 2~3 parts of biomimetic wellbore strengthener, 1~3 parts of filtrate reducer with high temperature resistance, 1~3 parts of bonding lubricant, 0.2~0.5 parts of coating agent, 4~30 parts of salt, and weighting agent.

The water-base drilling fluid provided in the embodiment of the present disclosure is an amphiphobic high-performance water-base drilling fluid, which is mainly scientifically compounded by the synergist with biomimetic inhibitor, biomimetic plugging agent, biomimetic wellbore strengthener, filtrate reducer with high temperature resistance and coating agent to prevent or reduce the liquid phase from entering the rock by changing the surface free energy of the rock. At the same time, the change of free energy prevents the capillary effect of the rock, reduces the damage to the rock itself, enhances the cohesion of the rock particles, and avoids the well wall instability caused by the capillary force; In addition, the nanoparticles in the synergist can block the rock crevices. It can be seen that the amphiphobic high-performance water-base drilling fluid can achieve the four-in-one effects of drag reduction, protection of oil-gas formations, stabilization of well wall, and speed increase, thereby achieving drilling goals of safe, efficient, economical and environmental protection. Further, the soil slurry is bentonite soil slurry with a mass fraction of 1%-4%. Specifically, the soil slurry can be obtained by adding bentonite for drilling fluid into water, stirring at high speed for 20 min, and maintaining at room temperature for 24 h.

Further, the biomimetic inhibitor is aromatic amine hydrochloride. Specifically, the biomimetic inhibitor uses aromatic amine as a raw material to synthesize aromatic amine hydrochloride with biomimetic group (dopamine hydrochloride) through multi-step organic reaction.

Further, the biomimetic plugging agent is polyimide modified nano graphene oxide. Specifically, the biomimetic plugging agent is obtained by polyimide surface modification of graphene oxide nanomaterials with graphene oxide as raw material.

Further, the main chain of the biomimetic wellbore strengthener is a methacrylate copolymer, and the side chain is grafted with dopamine hydrochloride. Wherein the methacrylate copolymer includes at least one of stearyl methacrylate and polyethylene glycol methacrylate. Specifically, the biomimetic wellbore strengthener takes a water-soluble polymer methacrylate copolymer with a large number of hydroxyl groups as the main chain, and grafts the biomimetic group (dopamine hydrochloride) to the side chain of the polymer through free radical graft polymerization to synthesize a water-soluble polymer with biomimetic groups.

Further, the bonding lubricant is a fatty acid glyceride lubricant. Specifically, the bonding lubricant is a fatty acid glyceride lubricant synthesized by mimicking the bonding between clay and the mucus secreted by earthworms.

Further, the coating agent is obtained by copolymerization of acrylamide. Specifically, the coating agent is a multi-element copolymer emulsion formed by multi-element copolymerization with acrylamide as the main raw material.

Further, the filtrate reducer with high temperature resistance (the high temperature filtrate reducer) uses fibers and high temperature resistant materials as raw materials to obtain the filtrate reducer with high temperature resistance.

Further, the salt can be selected from at least one of sodium chloride, potassium chloride, sodium formate, and potassium formate.

Further, the weighting agent can be selected from at least one of barite and limestone. The density of the weighting agent can be 1~3 g/cm$^3$. In one embodiment, the weighting agent is barite, and the density of barite can be 1.4 g/cm$^3$.

Further, the drilling fluid further includes alkali, such as NaOH. The alkali is mainly to adjust the pH value of drilling fluid.

Another embodiment of the present disclosure also provides a preparation method for the above drilling fluid, comprising the following steps:

mixing soil slurry, biomimetic inhibitor, biomimetic plugging agent and biomimetic wellbore strengthener;

adding filtrate reducer with high temperature tolerance and mixing;

adding synergist, bonding lubricant, coating agent and mixing;

adding salt and weighting agent and then mixing to obtain the drilling fluid product.

In further embodiments, the preparation method comprises the following steps:

putting soil slurry into the slurry cup of the mixer with the stirring speed of 70~80 r/min, adding biomimetic inhibitor, biomimetic plugging agent and biomimetic wellbore strengthener under stirring and stirring for 10 min; adding the filtrate reducer with high temperature resistance and stirring for 10 min; adding the synergist, bonding lubricant and coating agent and stirring for 10 min; adding salt and weighting agent and stirring for 1 h to obtain the drilling fluid product.

An embodiment of the present disclosure further provides an application of the above drilling fluid in the exploition of shale gas. The present disclosure will be described in detail below in conjunction with the embodiments.

Example 1. Preparation Method of a Synergist for Water-Base Drilling Fluid 30 parts of distilled water, 5 parts of ethanol and 5 parts of didodecyldimethylammonium bromide (didodecyl(dimethyl)azanium, bromide) were added into a reaction kettle and stirred evenly. The mixture was heated to 75° C., and 15 parts of nano silica with a particle size of 100-500 nm, 10 parts of paraffin wax, and 2 parts of n-octyl triethoxysilane were added to carry out surface modification of silica for 2~3 h, and cooled to room temperature. 20 parts of sodium styrene sulfonate, 10 parts of allyl trimethyl ammonium chloride, 1 part of disodium lauryl alcohol sulfosuccinate and 2 parts of propyl triethoxy silane were added and stirred evenly. The mixture was heated to 50-75° C. and reacted for 8-16 h to obtain an ester emulsion product. The raw materials mentioned were calculated by weight.

Example 2. Preparation Method of a Synergist For Water-Base Drilling Fluid

It was the same as Example 1 except 5 parts of n-octyl triethoxysilane and 5 parts of propyl triethoxysilane.

Example 3. Preparation Method of a Synergist For Water-Base Drilling Fluid

It was the same as Example 1 except that 20 parts of nano silica were added.

Example 4. Preparation Method of a Water-Base Drilling Fluid 400 mL of soil slurry (the mass concentration of soil slurry was 3%)+1% filtrate red ucer with high temperature resistance (4 g)+3% biomimetic plugging agent (12 g)+3% synergist obtained in Example 1 (12 g)+2% biomimetic wellbore strengthener (8 g)+2% biomimetic inhibitor (8 g)+0.2% coating agent (0.8 g)+28% salt (112 g)+2% bonding lubricant (8 g)+barite (density: 1.4 g/cm$^3$)+0.3% NaOH (1.2 g).

The preparation method was as follows:

mixing Soil slurry, biomimetic inhibitor, biomimetic plugging agent, and biomimetic wellbore strengthener were added into a reaction kettle;

adding filtrate reducer with high temperature resistance and mixing;

adding synergist, bonding lubricant, coating agent and mixing;

adding salt, NaOH, weighting agent and mixing to obtain the product.

Example 5. Preparation Method of Water-Base Drilling Fluid

It was the same as Example 4, except that the synergist was prepared in Example 2.

Example 6. Preparation Method of Water-Base Drilling Fluid

It was the same as Example 4, except that the added amount of the synergist was 4%.

Comparative Example 1. Traditional High-Performance Environmental Protection Drilling Fluid 3% soil powder+0.2% Na$_2$CO$_3$+0.3% coating agent+ 0.8% filtrate reducer+3% plugging agent NFA-25+3% polyalcohol PGCS-1+40% organic salt+3% microsphere polymer+3% lubricant+barite (density: 1.4 g/cm$^3$).

Comparative Example 2. Traditional Oil-Based Drilling Fluid 1.4 g/cm$^3$ white oil-based system.

It should be pointed out that the source of the raw materials used in the embodiments of the present disclosure is not specifically limited. For example, they may be commercially available.

Test Example 1. Characterization of the Synergist Product (1) Transmission Electron Microscope (TEM) Test The synergist obtained in Example 1 was mixed with ethanol at a mass ratio of 0.05:9.95. After ultrasonic dispersion for 40 min, it was dropped onto the copper micro grid covered with carbon film, dried with an infrared lamp, and scanned by the transmitted electron microscopy (JEM-2100 LaB6 type high resolution transmission electron microscope from Japan JEOL company was used for TEM analysis), and the result was shown in FIG. 1.

Referring to FIG. 1, the size of the synergist was 50~100 nm. There were many uneven rough structures on the surface of the synergist. At the same time, there were interconnected branches between the products, and the special physical structure played an important role in its hydrophobic and oleophobic properties.

(2) Scanning Electron Microscope (SEM) Test

The same core was sliced and polished into two parts, wherein one part was immersed in the synergist aqueous solution (3 wt %) obtained in Example 1 for 2 h, dried at 100° C. for 4 h, and then scanned with the electron microscope. The result was shown in FIG. 2(b); the other part did not need to be immersed in the synergist solution, dried directly at 100° C. for 4 h, and then scanned by electron microscope. The result was shown in FIG. 2(a).

Figure 2:
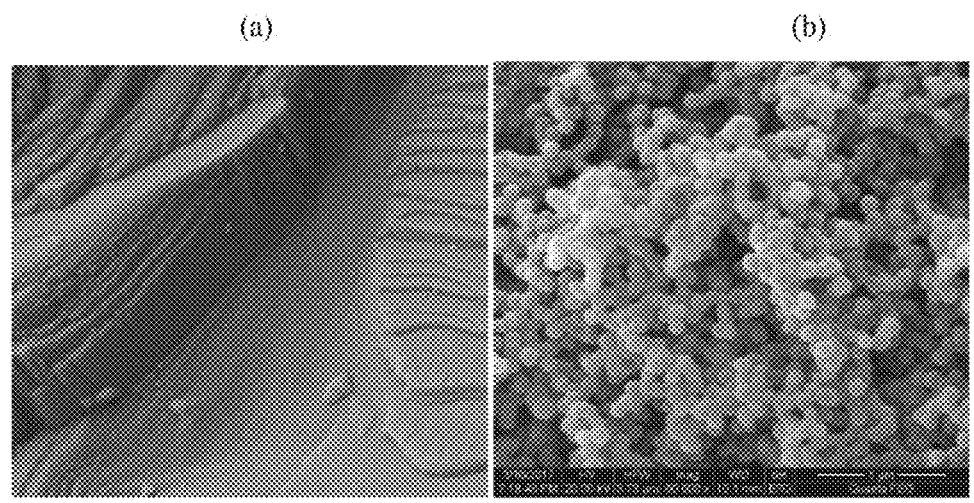
FIG. 2 shows a scanning electron micrograph of the synergist obtained in Example 1.

Referring to FIG. 2(a), the surface of the untreated core was very smooth on the nano-micro scale with only a small amount of layered structure, so the core surface exhibited hydrophilic and lipophilic properties. Referring to FIG. 2(b), the surface of the core was covered with many micro-nano products after the treatment with the synergist, and the synergist products were also connected to each other, making the surface of the core after the treatment show a physical structure of nano-micro multi-level scale as a whole, which was conducive to its amphiphobic performance.

Figure 3:
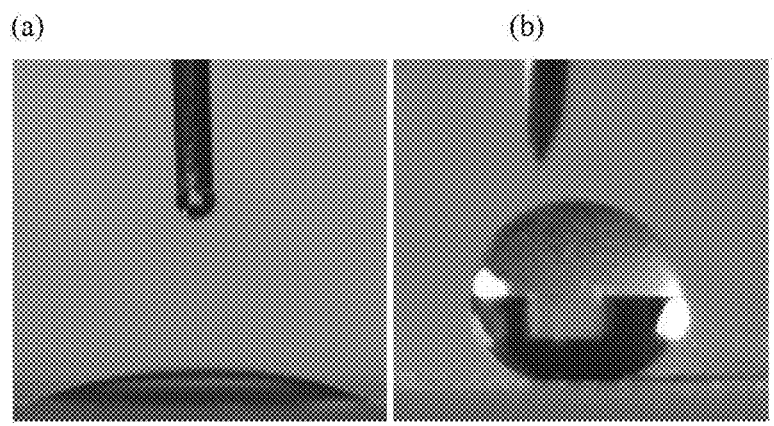
FIG. 3 shows a change of the aqueous phase contact angle of the core before (a) and after (b) treatment with the synergist obtained in Example 1.

Test Example 2. Hydrophobic and Oleophobic Performance Test of the Synergist-Contact Angle The sandstone core (artificial sandstone core (permeability: 30 mD)) was immersed in the synergist solution obtained in Example 1 for 2 h, and dried at 80° C. for 2 h. The contact angle was measured with deionized water and white oil, and the average of five measurements was taken. The results were shown in Table 1 (①, ② and ③ were the parallel sample tests) and FIG. 3 (① was obtained from the parallel sample test).

FIG. 3(a) was the water contact angle of the core before treatment with the synergist; FIG. 3(b) was the water contact angle of the core after treatment with the synergist. Comparing FIG. 3(a) and FIG. 3(b), it could be seen that the contact angle was significantly increased after treatment with the synergist, which could obviously prevent the water or oil phase from entering the reservoir, inhibited the expansion of the clay in the rock, and at the same time reduced the damage to the reservoir, and protected the reservoir. The synergist was adsorbed on the surface of the rock and could also act as a lubricant.

TABLE 1

Effect of the synergist on the wettability of sandstone core surface
Contact angle/°

| | No. | | |
|---|---|---|---|
| | ① | ② | ③ |
| Not added | 0 | 0 | 0 |
| water contact angle | 155.21 | 152.53 | 151.85 |
| oil contact angle | 66.82 | 67.68 | 68.63 |

Test Example 3. Evaluation of Surface Free Energy After Treatment of the Core Surface With the Synergist Using the Owens two-liquid method, the two-phase contact angle of water and oil (n-hexadecane) obtained after the treatment of the core surface with the synergist was measured by the contact angle, and the surface free energy of the core after the treatment was calculated. The result was shown in FIG. 4.

Figure 4:
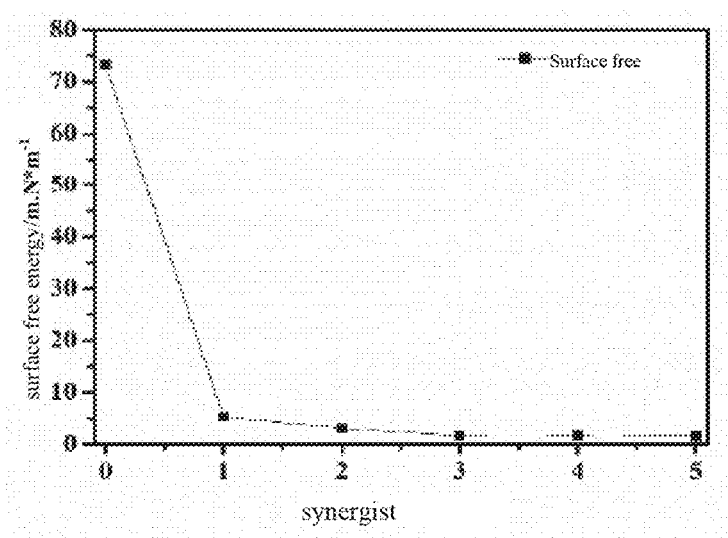
FIG. 4 shows a change of the influence of the synergist obtained in Example 1 on the surface free energy of the core.

Referring to FIG. 4, when the synergist concentration reached more than 3 wt %, the core surface free energy was reduced to less than 5 mN/m, reaching a low surface energy level.

Test Example 4. Evaluation of Natural Imbibition After Treatment of the Core With the Synergist The core was placed in an oven at 105° C. for 4 h, and then immersed in 5% of the synergist aqueous solution obtained in Example 1 for 12 h. Finally, the immersed core was placed in an oven at 105° C. to be dried until the quality was constant, and taken out for the determination of natural imbibition content. The result was shown in FIG. 5.

Figure 5:
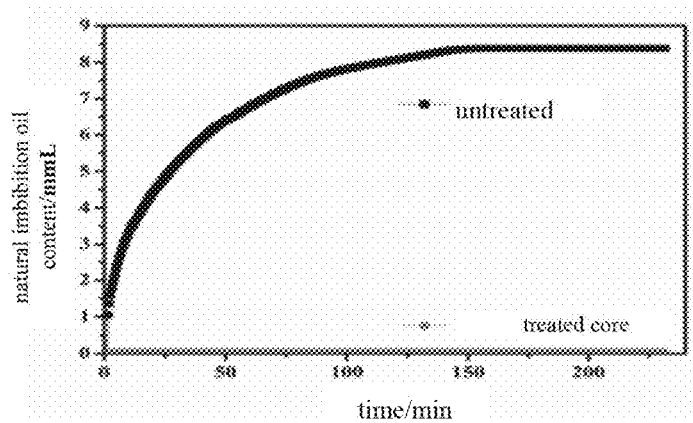
FIG. 5 shows the result of the natural imbibition experiment of the synergist obtained in Example 1.

Referring to FIG. 5, the synergist improved the wetting performance of the surface by adsorbing on the surface of the core and the pores, thereby further changing the force of the fluid in the pores. After treatment with the synergist, the surface of the core and the surface of the pore throat were lyophobic, therefore, the core changed from spontaneous imbibition to a state of inhibiting fluid entry. The natural imbibition content of the core was reduced from 8.38 mL to 0.03 mL, which effectively prevented fluid from entering the core and protected the reservoir from fluid damage.

Test Example 5. Evaluation of Temperature Resistance of the Synergist

The core (artificial sandstone core (permeability 30 mD)) immersed in the synergist solution obtained in Example 1 was placed in a muffle furnace at 150° C. for high temperature treatment, and the contact angle was measured after cooling. The result was shown in Table 2, wherein ①, ②, and ③ were parallel sample tests. Referring to Table 2, compared with the wettability of the synergist without high temperature treatment in Table 1, the synergist could effectively resist the temperature of 150° C.

TABLE 2

Effect of the synergist on the wettability of sandstone core surface after high temperature treatment at 150° C. water contact angle/°

| | No. | | |
|---|---|---|---|
| | ① | ② | ③ |
| water contact angle | 151.18 | 148.27 | 145.33 |
| oil contact angle | 66.23 | 67.46 | 66.84 |

Test Example 6. Evaluation of Filtrate Loss Performance of the Drilling Fluid The drilling fluid obtained in Example 4 was aged at 120° C. for 16 h~72 h to test the rheological property of the drilling fluid system, including apparent viscosity AV, plastic viscosity PV, dynamic shear force YP, static shear force Gel, φ6/φ3, fluid loss FL, etc. The result was shown in Table 3.

TABLE 3

| | | \multicolumn{7}{c}{Rheological property of the drilling fluid} | | | | | | |
|---|---|---|---|---|---|---|---|---|
| | | AV (mPa·s) | PV (mPa·s) | YP (Pa) | Gel Pa | $\Phi_6/\Phi_3$ | API (ml) | $FL_{HTHP}$ (ml) |
| Embodiments 4 | Before aging | 44 | 33 | 11 | 2.5/4.5 | 6/4 | | |
| | Aging for 16 h | 37.5 | 26 | 11.5 | 2.5/4.5 | 5/3 | 1.6 | 4.6 |
| | Aging for 48 h | 35 | 25 | 10 | 2.5/4 | 4/3 | 1.6 | 4.8 |
| | Aging for 72 h | 32.5 | 25 | 7.5 | 2/3 | 4/3 | 2.2 | 5.4 |
| Embodiments 5 | Before aging | 44 | 32 | 12 | 2.5/4 | 5/4 | | |
| | Aging for 16 h | 37 | 26 | 11 | 2.5/4 | 5/4 | 1.4 | 4.4 |
| | Aging for 48 h | 36 | 25 | 11 | 2/4 | 4/3 | 1.6 | 4.8 |
| | Aging for 72 h | 32 | 25 | 7 | 2/3 | 4/3 | 2.0 | 5.4 |
| Comparative Example 1 | Before aging | 40 | 34 | 6 | 3/4 | 3/2 | | |
| | Aging for 16 h | 20 | 16 | 4 | 2.5/5.5 | 4/3 | 2 | 6.2 |
| | Aging for 48 h | 26.5 | 22.5 | 4 | 1/2 | 3/2 | 2 | 6.8 |
| | Aging for 72 h | 25 | 22 | 3 | 1/2 | 3/2 | 2.8 | 7.4 |
| Comparative Example 2 | Before aging | 44.5 | 34 | 10.5 | 2/5 | 5/4 | | |
| | Aging for 16 h | 37.5 | 28 | 9.5 | 2/5 | 5/4 | 1.2 | 4.6 |
| | Aging for 48 h | 37 | 28 | 9 | 2/5 | 5/4 | 1.2 | 4.8 |
| | Aging for 72 h | 36 | 26 | 10 | 2/5 | 5/4 | 1.4 | 5.2 |

Note:
Rheological test temperature was 60° C.; HTHP: 120° C., 3.5 Mpa.

Referring to Table 3, compared with the water-base drilling fluids, the oil-base drilling fluids normally were excellent in terms of stabilization of well wall and inhibition of hydration expansion, but poor in environmental protection, which was well known to those in the art. Surprisingly, the water-base drilling fluids provided by the present disclosure were excellent in terms of stabilization of well wall and inhibition of hydration expansion. Apparent viscosity AV, plastic viscosity PV, dynamic shear force YP, static shear force Gel and φ6/φ3 of the water-base drilling fluid obtained in Examples 4 and 5 of the present disclosure were equivalent to that of the commonly used oil-based drilling fluid of Comparative Example 2 and the environmental protection system drilling fluid of Comparative Example 1. The filtrate loss reduction was better than that of the environmental protection system drilling fluid, and was basically the same as the commonly used oil-based drilling fluid. It could be seen that the water-base drilling fluid provided by the present disclosure had better performance.

Test Example 7. Test of the Pressure-Bearing Plugging Performance of the Drilling Fluid System The PPT sand table plugging experiment (5D sand plate with an average pore diameter of 5 μm) was used to evaluate the pressure-bearing plugging performance of the obtained drilling fluid at 120° C. The result was shown in Table 4.

TABLE 4

Pressure-bearing plugging performance of the drilling fluid

| Drilling Fluid type | | Differential pressure | | | | | | Evaluation parameters | |
|---|---|---|---|---|---|---|---|---|---|
| | | 7.0 MPa | | | | 12.0 MPa | | Filtrate loss rate | $V_{PPT}$ mL/30 |
| | | time | | | | | | | |
| | | 1 min | 7.5 min | 30 min | 60 min | 90 min | 120 min | mL/min | min |
| Example 4 | Filtration loss mL | 1.2 | 1.8 | 3.4 | 4.0 | 5.0 | 6.0 | 0.03 | 6.8 |
| Example 5 | Filtration loss mL | 1.2 | 1.6 | 3.2 | 4.0 | 5.0 | 6.0 | 0.03 | 6.4 |
| Comparative Example 1 | Filtration loss mL | 2.4 | 3.4 | 4.6 | 6.0 | 7.0 | 9.0 | 0.06 | 9.2 |
| Comparative Example 2 | Filtration loss mL | 1.0 | 1.6 | 3.0 | 3.8 | 4.8 | 5.8 | 0.03 | 6.0 |

Note:
$V_{PPT} = 2 \times V_{30\,min}$ (i.e., 2 times the 30 min filtrate loss); filtrate rate = $(V_{120\,min} - V_{90\,min})/30$ min (i.e., 120 min filtrate rate minus 90 min filtrate rate and then divided by 30 min). Referring to Table 4, the drilling fluid systems provided in Examples 4 and 5 of the present disclosure had good plugging properties. Nanoparticles in the system could block micro-cracks, decrease the penetration of the drilling fluid filtrate into the formation, reduce the damage to the formation, and reduce the well wall instability.

Test Example 8. Rolling Recovery Performance Test of Detritus in the Drilling Fluid System Detritus (6-10 mesh) from Minghua Town in Dagang oilfield was used to compare and evaluate the rolling recovery performance of the detritus rolling at 120° C. for 16 h. The result was shown in Table 5.

TABLE 5

Rolling recovery comparative evaluation of detritus in the drilling fluid system

| Drilling fluid type | Clean water | Example 4 | Example 5 | Comparative Example 1 | Comparative Example 2 |
|---|---|---|---|---|---|
| Rolling recovery, % | 40.2 | 99.0 | 99.2 | 86.2 | 99.2 |

Referring to Table 5, the rolling recovery of the detritus of the present disclosure reached the oil-based mud level, and was higher than that of the environmental protection system of Comparative Example 1, indicating that the system of the present disclosure had good inhibition.

Test Example 9. Permeability Recovery Value Performance Test of the Drilling Fluid System A sandstone core with a permeability of 18 mD was used to compare and evaluate the system and the result was shown in Table 6.

TABLE 6

Permeability recovery value evaluation of the drilling fluid system

| Drilling fluid type | Original permeability (D) | Damage permeability (D) | Permeability recovery value % |
|---|---|---|---|
| Example 4 | 0.179 | 0.175 | 97.8 |
| Example 5 | 0.178 | 0.174 | 97.8 |
| Comparative Example 1 | 0.180 | 0.166 | 92.2 |
| Comparative Example 2 | 0.178 | 0.175 | 98.3 |

Referring to Table 6, the permeability recovery value of the system of the present disclosure could reach the level of the oil-based drilling fluid of Comparative Example 2, and was higher than that of the environmental protection system of Comparative Example 1, indicating that the reservoir protection effect of the drilling fluid system of the present disclosure was obvious.

Test Example 10. Hydrophobic Performance Test of the Drilling Fluid System

Figure 6:
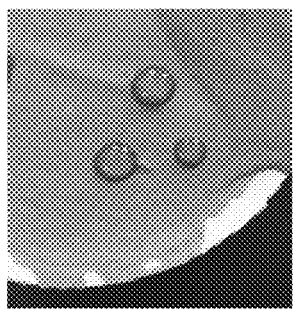
Figure 6:
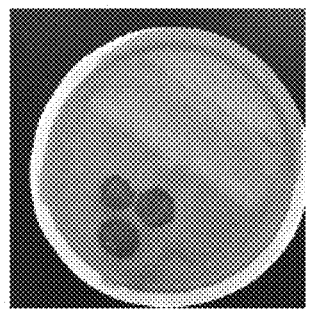

After rolling aging of each system, the mud cake with medium pressure filter loss was taken, and dried at 90° C. for 1 h. Dripping water on the medium-pressure mud cake after drying was observed, and the result was shown in FIG. 6. Wherein FIG. 6(a) is a hydrophobic effect diagram of the drilling fluid obtained in Example 4, and FIG.(b) is a hydrophobic effect diagram of the environmental protection system drilling fluid in Comparative Example 1.

It could be seen from the comparison of FIG. 6(a) and FIG. 6(b) that the hydrophobic effect of the drilling fluid of the present disclosure was significantly better than that of the environmental protection system drilling fluid in Comparative Example 1.

Test Example 11. Field Application of the Drilling Fluid

In the present, the synergist-led amphiphobic high-performance water-base drilling fluid system was used in well Fang 29-2-1L and well 1701-1H of Dagang Oilfield. The implementation of the synergist-led amphiphobic high-performance water-base drilling fluid system in well Fang 29-2-1L and well 1701-1H showed that the system had good inhibition, plugging and lubricity. A number of indicators had reached the technical level similar to that of oil-based drilling fluid, which could solve the problem of well wall instability in Dagang Oilfield and meet the "safe, efficient and environmental protection" drilling needs of the shale oil in Dagang Oilfield.

The above is only preferred embodiments of the present disclosure and is not intended to be limiting of the present disclosure, and any modification, equivalent substitution, improvement and the like within the spirit and principles of the present disclosure are intended to be embraced by the protection range of the present disclosure.

We claim:

1. A synergist for water-base drilling fluid, prepared from raw materials comprising the following parts by weight:
   15~25 parts of sodium styrene sulfonate, 8~15 parts of allyl trimethyl ammonium chloride, 2~8 parts of didodecyldimethylammonium bromide, 1~5 parts of n-octyl triethoxy silane, 1~5 parts of propyl triethoxy silane, 1~5 parts of disodium lauryl sulfosuccinate, 10~20 parts of nano silica, 8~15 parts of paraffin, 2~8 parts of ethanol, and 25~35 parts of distilled water.

2. The synergist according to claim 1, wherein, the nano silica has a particle size of 100-500 nm.

3. A preparation method for the synergist according to claim 1, comprising the following steps:
   1) mixing didodecyldimethylammonium bromide with distilled water and ethanol, heating the mixture to 65~75° C. and adding nano silica, n-octyltriethoxysilane and paraffin to react to obtain a surface modified product; and
   2) cooling the obtained surface modified product, adding sodium styrene sulfonate, allyl trimethyl ammonium chloride, disodium lauryl sulfosuccinate and propyl triethoxy silane, then heating the mixture to 50~75° C. to react to obtain the synergist.

4. The preparation method according to claim 3, wherein, after mixing didodecyldimethylammonium bromide with distilled water and ethanol, heating the mixture to 65~75° C., then adding nano silica, n-octyltriethoxysilane, and paraffin to perform a reaction under 65~75° C. for 2~3 h to obtain a surface modified product.

5. The preparation method according to claim 3, wherein, cooling the obtained surface modified product to 20~40° C., then adding sodium styrene sulfonate, allyl trimethyl ammonium chloride, disodium lauryl sulfosuccinate and propyl triethoxy silane, and heating the mixture to 50~75° C. to perform a reaction under 50~75° C. for 8~16 h to obtain the synergist.

6. The preparation method according to claim 4, wherein,
   1) mixing didodecyldimethylammonium bromide with distilled water and ethanol, heating the mixture to 65~75° C., then adding nano silica, n-octyltriethoxysilane, and paraffin to perform a reaction under 65~75° C. for 2~3 h to obtain a surface modified product; and
   2) cooling the obtained surface modified product to 20~40° C., then adding sodium styrene sulfonate, allyl trimethyl ammonium chloride, disodium lauryl sulfosuccinate and propyl triethoxy silane, and heating the mixture to 50~75° C. to perform a reaction under 50~75° C. for 8~16 h to obtain the synergist.

7. A water-base drilling fluid, comprising the synergist according to claim 1.

8. The drilling fluid according to claim 7, wherein, the drilling fluid is prepared from raw materials comprising the following parts by weight:
   90~110 parts of soil slurry, 2~4 parts of synergist of claim 1, 1~2 parts of biomimetic inhibitor, 2~b 3 parts of biomimetic plugging agent, 2~3 parts of biomimetic wellbore strengthener, 1~3 parts of high temperature filtrate reducer, 1~3 parts of bonding lubricant, 0.2~0.5 parts of coating agent, 4~30 parts of salt, and weighting agent.

9. The drilling fluid according to claim 8, wherein,
   the biomimetic inhibitor is aromatic amine hydrochloride;
   the biomimetic plugging agent is polyimide modified nano graphene oxide; and
   the biomimetic wellbore strengthener is a compound having main chain of methacrylate copolymer and side chain of grafted with dopamine hydrochloride.

10. The drilling fluid according to claim 8, wherein,
   the bonding lubricant is a fatty acid glyceride lubricant;
   the coating agent is obtained by copolymerization of acrylamide;
   and the weighting agent is selected from the group consisting of barite and limestone.

* * * * *